(12) United States Patent
Horton et al.

(10) Patent No.: US 9,331,560 B2
(45) Date of Patent: May 3, 2016

(54) HEAT ENGINE FOR CONVERTING LOW TEMPERATURE ENERGY TO ELECTRICITY

(76) Inventors: Joel Horton, Maryville, TN (US); Brian Perkins, Alcoa, TN (US)

( * ) Notice: Subject to any disclaimer, the term of this patent is extended or adjusted under 35 U.S.C. 154(b) by 551 days.

(21) Appl. No.: 13/068,050

(22) Filed: Apr. 29, 2011

(65) Prior Publication Data

US 2011/0266813 A1    Nov. 3, 2011

Related U.S. Application Data

(60) Provisional application No. 61/329,212, filed on Apr. 29, 2010.

(51) Int. Cl.
| | | |
|---|---|---|
| *F02B 1/00* | (2006.01) |
| *H02K 53/00* | (2006.01) |
| *F02G 1/02* | (2006.01) |
| *F28D 17/00* | (2006.01) |

(52) U.S. Cl.
CPC ........ *H02K 53/00* (2013.01); *F02G 1/02* (2013.01); *F28D 17/00* (2013.01)

(58) Field of Classification Search
USPC ......... 290/1 R; 60/526, 641.8, 39.511; 165/4, 165/10, 140, 139, 6, 9.1, 9.2, 9.3, 9.4, 5, 7; 62/6

See application file for complete search history.

(56) References Cited

U.S. PATENT DOCUMENTS

| | | | | |
|---|---|---|---|---|
| 5,050,570 A | * | 9/1991 | Thring | ............................ 123/556 |
| 2008/0229766 A1 | * | 9/2008 | Sharma | ............................ 62/101 |
| 2008/0250788 A1 | * | 10/2008 | Nuel et al. | .................. 60/641.14 |

* cited by examiner

*Primary Examiner* — John Kwon
*Assistant Examiner* — Ruben Picon-Feliciano
(74) *Attorney, Agent, or Firm* — Maynard Cooper & Gale, P.C.; Curtis Dodd

(57) ABSTRACT

The disclosure relates to heat engines that operate using low temperature differentials. A Stirling engine is modified to provide a new heat engine that has no contained working fluid. The new heat engine flexible cylinders and the pistons are moved vertically upward by cables and vertically downward by gravity.

12 Claims, 17 Drawing Sheets

HEAT ENGINE FOR CONVERTING LOW TEMPERATURE ENERGY TO ELECTRICITY

CROSS REFERENCE TO RELATED APPLICATION

This application claims priority to U.S. Provisional Application No. 61/329,212, entitled "Heat Engine for Converting Low Temperature Energy to Electricity," and filed on Apr. 29, 2010, which is incorporated herein by reference.

FIELD OF THE INVENTION

The present disclosure generally relates to a heat engine, a modification of a Stirling engine, adapted to work with low differential temperatures. The heat engine is particularly applicable for temperature differentials that are smaller than generally accepted as useful. The engine is coupled to an electrical generator and converter system in order to interface with a power grid.

BACKGROUND AND RELATED ART

A heat engine is a device that converts thermal energy, an input, to mechanical work, an output. A heat engine typically operates on a specific thermodynamic cycle principle. A Stirling engine is a well known heat engine that operates by cyclic compression and expansion of a working fluid, such as air or another gas, at different temperature levels such that there is a net conversion of heat energy to mechanical work. A knowledge of the Stirling engine is helpful for an understanding the novel engine of the present disclosure.

A good source for understanding the Stirling engine is available at http://www.animatedengines.com/vstirling.shtml where an animated description of the engine is provided. U.S. Pat. No. 7,171,811, "Multiple-Cylinder, Free-Piston, Alpha Configured Stirling Engines and Heat Pumps with Stepped Pistons", file on Sep. 29, 2005 describes related heat engines and is incorporated herein by reference.

The Stirling engine is like a steam engine in that all of the engine heat flows in and out through the engine wall. An engine having this type of heat flow is traditionally known as an external combustion engine in contrast to an internal combustion engine where the heat input is provided by combustion of a fuel within a cylinder of engine. However, unlike the steam engine's use of water in both its liquid and gaseous phases as the working fluid, the Stirling engine encloses a fixed quantity of permanently gaseous fluid such as air or helium. As in all heat engines, the general cycle consists of compressing cool gas, heating the gas, expanding the hot gas, and finally cooling the gas before repeating the cycle.

Originally conceived in 1816 as an industrial prime mover to compete with the steam engine, its practical use was largely confined to low-power domestic applications for over a century. The Stirling engine is noted for its high efficiency, quiet operation, and the ease with which it can use almost any heat source. This heat source compatibility is valuable when considering alternative and renewable energy sources. Further, such compatibility has become increasingly significant as the price of conventional fuels rises, and in light of concerns such as limited oil reserves and climate change. The engine is currently exciting interest as the core component of micro combined heat and power (CHP) units, in which it is more efficient and safer than a comparable steam engine.

It is generally not accepted that large thermal heat engines are a viable component for providing mechanical energy from low grade heat sources such as waste heat, natural sources, and solar energy from non-concentrating collectors. Heat engines are commonly considered as uneconomical as the temperature difference between a heat source and a cooling source becomes small, i.e., the difference approaches zero.

Because of this generally accepted view, large heat engines using air as the working fluid with small temperature differences are not commercially available. Even though table top Stirling engines have operated with air as the working fluid at temperature differentials as low as around 0.5 degrees centigrade with around one watt of output, essentially no effort has been put forth to build large heat engines. Small demonstration Stirling engine models are often advertised as available for purchase, but no scale up possibilities have been described in their corresponding literature or elsewhere. Prior art literature continues to instruct that large engines could be built, however the literature indicates that they would be very large and probably have little economic value. No references have been found in public domain that encourages breaking away from conventional thinking, that it is not possible to create a large heat engine that operates on very low temperature differentials that is economical.

Currently, commercially available heat engines that show promise in the market place generally operate at high speeds, high pressures, and large temperature differentials. Such engines also use a working fluid other than air. Further, the conventional approach to building hot air engines uses expensive components and features of conventional internal combustion engines, such as, for example, machined cylinders and pistons, high pressure seals, and crank shafts, etc. Thus, such a hot air engine typically has features and an associated cost of high specific energy engines, but can only perform as a low specific energy engine. Therefore, a hot air engine using components of other engines have not been viable when low temperature differential are considered. Hence, the limited numbers of successful Stirling heat engines, even operating with high grade energy sources, are typically in the range of few horsepower. Such Stirling engines are usually small and tailored to specialized applications. One exception is a large specialized Stirling engine that is used in submarines, primarily because of the quietness of the engines operation.

It is known by some in area of heat engines that the largest heat engine, in physical size, to be built was demonstrated in the 250 foot Caloric ship. Even though the Caloric ship's engine was not a low temperature differential engine it is worthy of mention herein because of its size. The Caloric ship's engine had four 14 foot diameter expansion cylinders and pistons with six foot strokes for a total expansion displacement of 3,694 cubic feet. Even though the engine propelled the ship for many hours, the engine power output was well below expectations. Even though the engine showed promise it was declared unsuccessful by the educated engineers, scientist, and those skilled in the art of that time. The novel heat engine of the present disclosure operates on low temperature differentials and may have displacements greater than that of the Caloric ship's engine.

The present disclosure identifies the Caloric ship's engine low power output problem. The finding recognized that selection of engine speed in a regenerative engine, such as a heat engine, is paramount to performance. The most important reason that the Caloric ship's engine underperformed was an unmatched load reduced the engine's speed to about one third of its design speed, thereby substantially lowering its power output. With commercialization of internal combustion engines for vehicles, the need for a transmission that permits high engine RPM at low linear speeds is well recognized. The Caloric ship's engine had no such speed converter, the transmission. Hence its performance is somewhat analogous to starting a straight shift truck in high gear. The Caloric ship's engine would certainly have performed significantly better if the load had been properly matched to the torque-speed characteristics of it's heat engine.

As the demand for renewable energy continues there is a need to consider technology that is competitive with wind turbines, photovoltaic systems, solar towers, and other known renewable technologies. One way to make the comparison is to consider the payoff from an acre of farm land as will be discussed in the detailed description. Embodiments of a novel heat engine as described herein are competitive many electrical generating technologies, particularly in the southeastern United States.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

A path to a more successful heat engine is to avoid limitations of the prior art and to add desirable scaleable features. Prior art scale-up approaches for hot air engines in the literature have been limited. For one heat engine type, the Stirling, the Beal and West methods for performance calculations only offer approximations. These methods are theoretical and differ widely in terms of acceptable input parameters and output results. Further, they do not consider the desired engine speed which is a major factor in engine performance. Therefore, low pressure, low differential temperature engines and low specific power engines need design calculation methods that are more precise. Thus a model and calculator based on performance data from a number of actual engines becomes a necessity. A good such model and calculator is available on the website of Professor Koichi Hirata that called "The Simple Performance Prediction Method for Stirling Engine". A study of the parameters using the Hirata model and calculator offers instruction to desirable approaches to engine scale up.

Development of a novel heat engine having scale up properties for low temperature differentials is considered an unexpected result based on the literature published by those skilled in the art. Those skilled in the art have essentially abandoned large heat engine development. This is abandonment is demonstrated by the fact that Stirling engines are generally known by those skilled in the art as high temperature engines. It is generally accept that if the hot side of a heat engine is not at least 500 degrees F. (260 degrees C.) then the engine will be too bulky for the amount of power it produces. Novel components and arrangements for providing embodiments of a heat engine that operates at low temperature differentials. These temperature differentials are well below the generally acceptable limits as taught in the prior art. Such embodiments of a novel heat engine make feasible the use of a variety of low quality heat sources for electric power generation.

There appears to be no publicly available reports that describe the use of low temperature solar collectors to provide heated air with temperatures to 5 to 30 degrees C. above ambient to use for generating electricity via heat engines. Conventional solar energy approaches have been to improve collectors and obtain a higher temperature instead of finding a practical engine. Thermal energy from the sun for electric generation typically involves concentrating solar radiation. One exception is use of a solar tower surrounded by a large greenhouse like solar collector in system that does not use a thermal heat engine.

Figure 1:
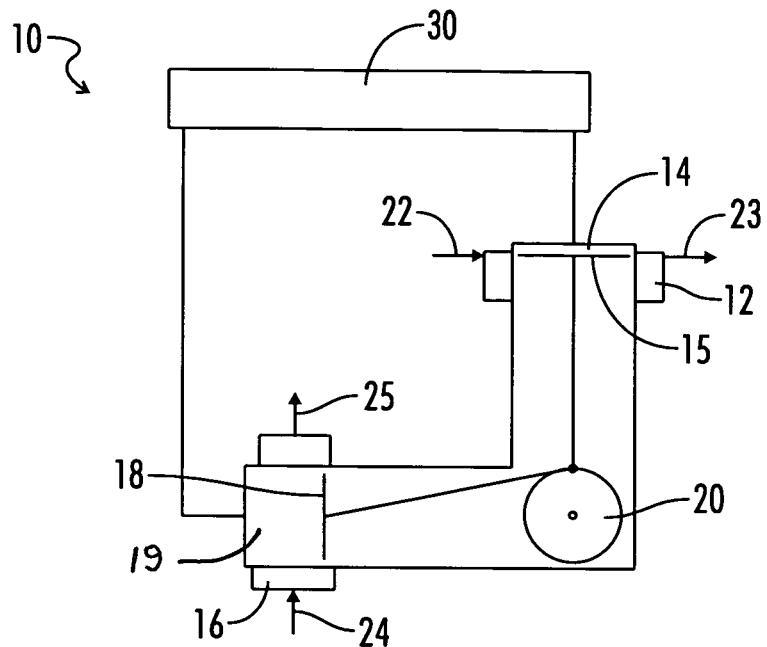
FIG. 1 is block diagram depicting of a conventional heat engine.

FIG. 1 depicts conventional heat engine, the Stirling heat engine 10. The Stirling engine 10 has a hot piston 18 within a hot cylinder 19 that receives heat through a hot side heat exchanger 16. The input to hot side heat exchanger 16 is a heating stream 24 that exits as an output stream 25 through an output channel. The Stirling engine 100 also has a cold piston 14 within a cold cylinder 15 that receives cooling through a cool side heat exchanger 12. Cooling for the cool side heat exchanger 12 is provided by a cooling stream 22 that exits as an output cooling stream 23. There is contained engine gas, such as air or helium, within the cylinders of the engine 10 that goes to and from a regenerator 30. The combination of the cylinders, pistons and the regenerator form a containment system for the engine gas. The Stirling engine 10 principle of operation is well known to those in skilled in the art. However, a brief discussion of its operation is instructive for understanding the operation of the new heat engine of the present disclosure.

The Stirling engine 10, like most heat engines, is designed so that the contained working gas is generally compressed in the cold portion of the engine and expanded in the hot portion of the engine thereby resulting in a net conversion of heat energy into mechanical energy or work. The regenerator 30 of the Stirling engine 10, sometimes referred to as a regenerative heat exchanger, increases the Stirling engine's thermal efficiency when compared to other hot air engines. Modifications to the Stirling engine 10 to form embodiments of a new heat engine are now described in such a way as to clearly differentiate the new engine from the Stirling engine and other known heat engines.

Figure 2:
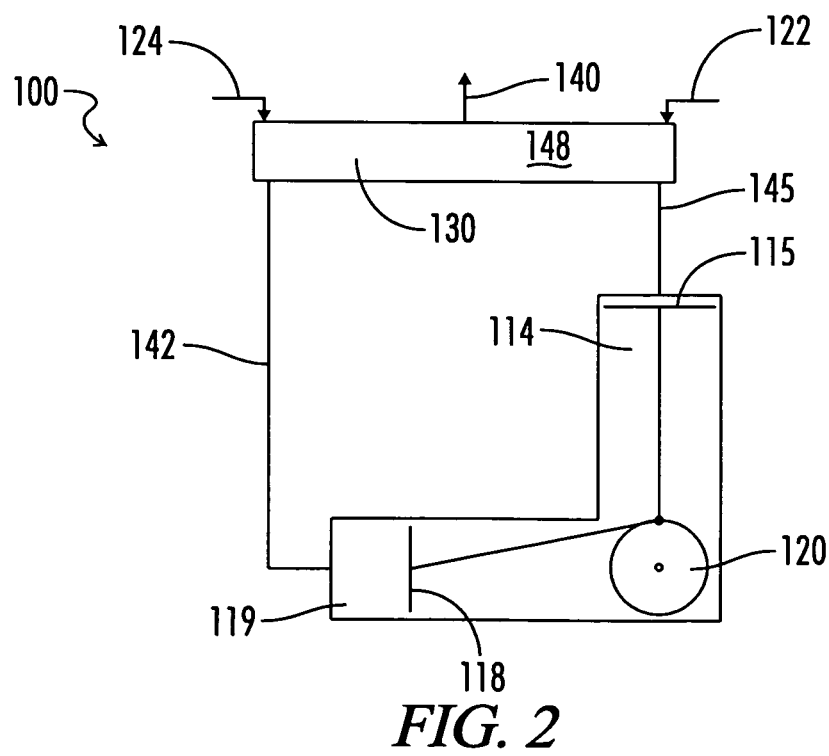
FIG. 2 depicts an embodiment of a heat engine in accordance with the present disclosure.

The new engine 100, as depicted in FIG. 2, will hereafter be called a "crossover engine". The crossover engine 100 has some elements in common with the Stirling engine 10. However, the crossover engine 100 does not have several elements of the Stirling engine 10. In addition, there are new elements unique to the crossover engine 100. Note that hot side heat exchanger 16 and the cold side heat exchanger 12 of the Stirling engine 10 are not shown as elements of the crossover engine 100 as depicted in FIG. 2. Further there is no contained gas or fluid within the crossover engine 100. When both of the heat exchangers 16, 12 and the contained gas component is removed from the Stirling engine 10, the crossover engine 100 no longer resembles conventional heat engines. For the crossover engine 100, the uncontained gas within the hot cylinder 119 is a portion of the hot stream 124 and the uncontained gas within the cold cylinder 114 is a portion of the cold stream 122 as will be described in more detail. For embodiments of the crossover engine 100, the gas of both streams is air, although the gas may be another substance in other embodiments. The regenerator 30 of the Stirling engine is not part of the crossover engine 100. It has been replaced with a new type of regenerator called a high-volume regenerator (HVR) 130.

The operation of the crossover engine 100 as depicted in FIG. 2 will now be described. The crossover engine 100 has a hot side cylinder 119 and a hot side piston 118. Further, the crossover engine 100 has a cold side cylinder 114 and a cold side piston 115. The cylinders 114, 119 and pistons 115 118 of the crossover engine function essentially the same as for the Stirling heat engine 10. However, the flow of heat energy is different. The high-volume regenerator 130 (HVR) serves as a heat transfer element for the crossover engine 100. The HVR 130 receives a portion of the heating stream 124 and the cooling stream 122. Heat energy from the heating stream 124 is coupled to the hot side cylinder 119 via a hot side conduit 142. The heat energy pushes the hot side piston 118 during the power stroke of the engine 100. The cold side stream provides cool air to the cold side cylinder 114 so that the air is easily compressed by the cold air piston 115 during the power stroke of the crossover engine 100. The synchronization or timing of the cylinders is essentially the same as for the Stirling cycle engine 10. When air leaves the hot air cylinder 119 during the exhaust cycle of the crossover engine 100 it flows to the HVR 130 and exchanges heat with the exhaust air from the cold side cylinder 115, acting on the same principle as with the Stirling cycle engine 10. However, rather than being reused as a contained gas, the HVR 130 discharges an exhaust stream 140 that is a mixture of air from the heating stream 124 and cooling stream 122.

The external heat exchangers 12, 16 of the Stirling engine 10 often limit the engines performance because of heat transfer characteristics. Also, for the crossover engine, by removing the heat exchangers 12, 16 there is an increase availability of energy especially for low temperature differentials. It is also known that heat exchangers for the Stirling cycle engine 10 have a complex design and are a major expense. Heat exchangers 12, 16 for a Stirling engine 10 often account for around 50 percent of the total Stirling engine cost.

A second modification of the Stirling engine 10 is to provide injection streams for heating and cooling at locations near to where the heat exchangers 12, 16 were eliminated. Heating and cooling streams can exchange more heat and with greater efficiently by flowing through the HVR 130 with quasi-reversible flow than through a conventional heat exchanger with limited surface area and large thermodynamic losses. Hence heat resources are better utilized. A reservoir that supplies energy in the form of heat is called a source and a sink is a location that absorbs energy. The HVR 130 functions as both a source and a sink. The amount of heat exchanged in the regenerator 30 of the Stirling engine 10 is typically many times the amount exchanged by the heating and cooling heat exchangers 12, 16 as seen in FIG. 1. Therefore a conventional regenerator 30 must be large enough to handle the additional flow. Also the flow of the heating and cooling streams along an appropriate uniform temperature profile in the HVR 130 can approaches quasi-reversible heat transfer which is a very efficient method of heat exchange. Thus, heating stream 124 and cooling stream 122 injection into the HVR 130 provide an attractive opportunity for scale-up and increased engine capacity. The crossover engine 100 of the present disclosure, operating on low temperature differentials and pressures, provide a mechanical drive for electric generators in that produce around 50 to 100 KW. In other embodiments other sizes of generators are possible. The crossover engine 100 capacity is proportional to engine size and the engine has favorable scale up possibilities as will be seen. The size of the crossover engine may approach the length of two typical wind turbine blades of approximately 50 meters. Although larger sizes are possible they may not always be desirable. Therefore, for some applications, smaller diameter engines with multiple cylinders are more practical.

Another modification of the Stirling engine 10 is to the addition of one or more exit ports along the HVR 130 for exit of a discharge stream 140 as will be described. Flexibility is provided in locating the exit ports to best balance the cost of the input streams. An exit port for a discharge stream is placed at mid point when there are two streams of equal value. The exit port for one embodiment of the HVR 130 for the combination of a high value stream and a low value stream is place near the location of the low value stream. For two streams of equal value and flow rate, the mid point is chosen for the location of the exit port.

The crossover engine 100 is considered to be a large crossover engine if the engine has an HVR 130 of more than 50 cubic feet. Further, in most embodiments, the regenerator thickness is less than the perpendicular dimension of the cylinder of the novel engine. Prior art teaches that low-temperature, low-pressure heat engines are very large. However, that is basically where the prior art ends relative to very large engines. The embodiments of disclosure have unexpectedly recognized that as a bulky regenerator configuration shape such as a cube becomes larger the optimum speed and thus specific power level is reduced. Therefore the thickness of very large regenerators, such as the HVR 130, must be limited to maintain a reasonable and economical speed and specific power level. Thus for very large regenerative engines with practical regenerator thickness the cross section becomes very large. Therefore, regenerators with very large cross sections must be dealt with in the physical design or dimensionally reduced by using multiple regenerators in parallel. Thus for embodiments of a large crossover engine the HVR 130 is comprised of multiple smaller regenerators in a parallel flow arrangement. The use of relative short flow paths through multiple large cross sections of the HVR 130 provide a major advantage in scale up of the crossover engine 100. Details of embodiments of several HVRs are shown in figures that follow.

Figure 3:
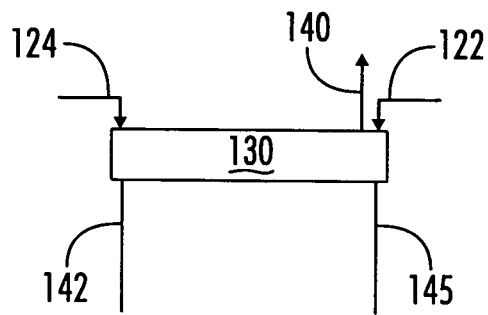
FIG. 3 depicts an embodiment of a regenerator for the disclosed heat engine of FIG. 2.

FIG. 3 depicts a HVR 130 where the heating stream 124 is the most costly of the two input streams. When such a cost condition takes place, the HVR 130 has an exit port located close to the cooling stream 122 input since it is the low cost stream. Hence, the discharge stream 140 does not waste the costly heat of the heating stream 124.

Figure 4:
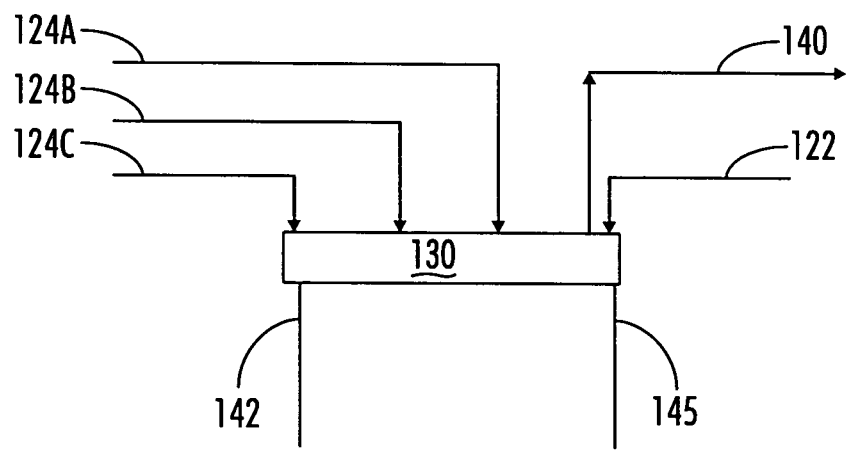
FIG. 4 depicts an embodiment of a regenerator with multiple input ports for multiple hot air streams for the heat engine of FIG. 2.
Figure 5:
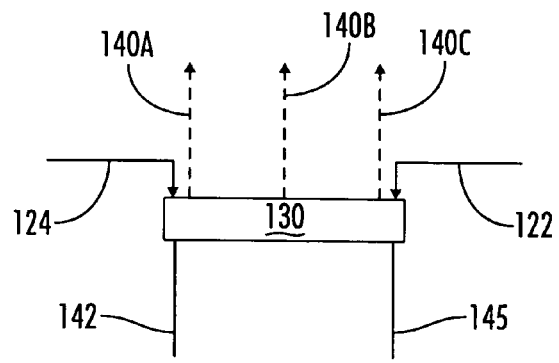
FIG. 5 depicts another embodiment of regenerator having selectable output ports for the heat engine of FIG. 2.

FIG. 4 depicts an HVR 130 where heat energy is available from several sources. For the embodiment of the HVR 130 as shown in FIG. 4, there are three input heating streams 124A, 124B and 124C. Each of the streams has different heat content. In other embodiments different numbers of heating streams are possible. There are other embodiments where there may be more than one cooling stream 122. FIG. 5 illustrates different locations for the exit port for the discharge stream 140 that is based on the cost of the input streams. The location of the exit ports is dependent on the comparative cost values of the input streams as discussed above for FIG. 3.

Figure 6:
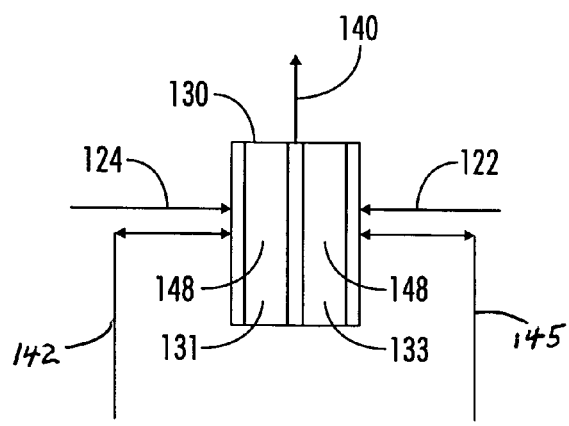
FIG. 6 depicts details of an embodiment of a regenerator for the heat engine of FIG. 2.
Figure 7:
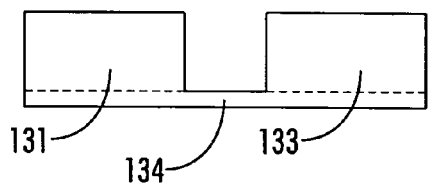
FIG. 7 depicts another embodiment of a regenerator for the heat engine of FIG. 2.

FIG. 6 depicts a cross section of an embodiment of the HVR 130 containing thermal material 148. The thermal material has desirable levels of heat transfer so that heat exchange can occur quickly. FIG. 7 shows an HVR 130 that has two halves 131, 133 that are connected by a regenerator conduit 134.

Figure 8:
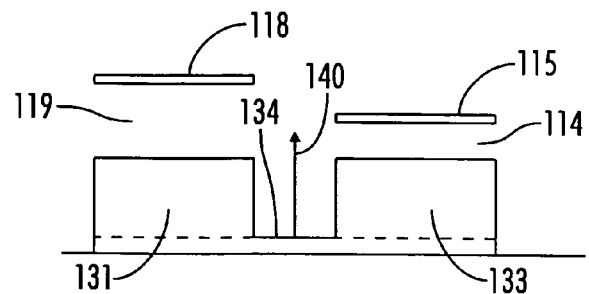
FIG. 8 depicts an embodiment of a heat engine of FIG. 2.
Figure 9:
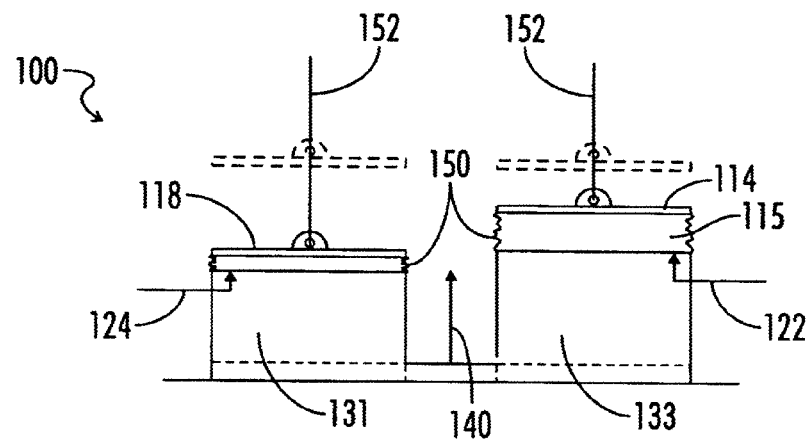
FIG. 9 depicts further details for heat engine of FIG. 8.
Figure 10:
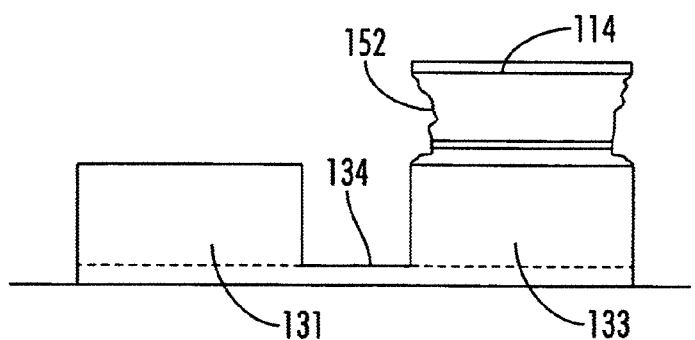
FIG. 10 depicts an embodiments of a flexible cylinder wall for the engine of FIG. 8.
Figure 11:
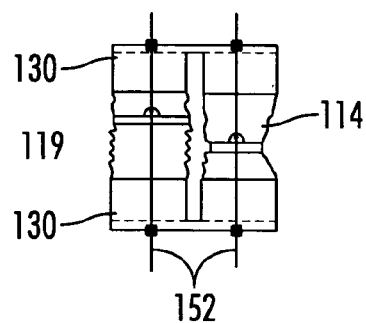
FIG. 11 depicts additional details for the heat engine of FIG. 8.

A view of a portion of an embodiment of a crossover engine 100 is depicted in FIG. 8. The HVR 130 is positioned on the ground (not shown) or a supporting structure. Above one half of the HVR 130 is the hot piston 118 and above the second half of the HVR 130 is the cold piston 115. The pistons are shown in an offset position to indicate that they are out of phase. FIG. 9 depicts an embodiment of the crossover engine portion shown in FIG. 8 where a tension media 152 is provided for moving the pistons in the upward direction. The tension media is comprised of cables, pulleys, and a synchronization wheel. The cables are in tension and provide a force to move the pistons upward. Gravity acting on the weight of the pistons provides a force for downward motion of the pistons. The cylinders 114, 119 for the embodiment of FIG. 8 are comprised of flexible fabric that is attached at two places to the HVR 139 and to the pistons 115, 118. In another embodiment, as depicted in FIG. 10, the cold cylinder 114 is forced into a reduced size by placing a band around the flexible fabric. FIG. 11 depicts a crossover engine having a hot piston with two cylinders and a cold piston with two cylinders. Motion is provided by a tension media that is attached as shown at two places on each of the pistons. The tension media as shown in FIG. 11 is used to move the pistons in both the upward and downward direction.

Figure 12:
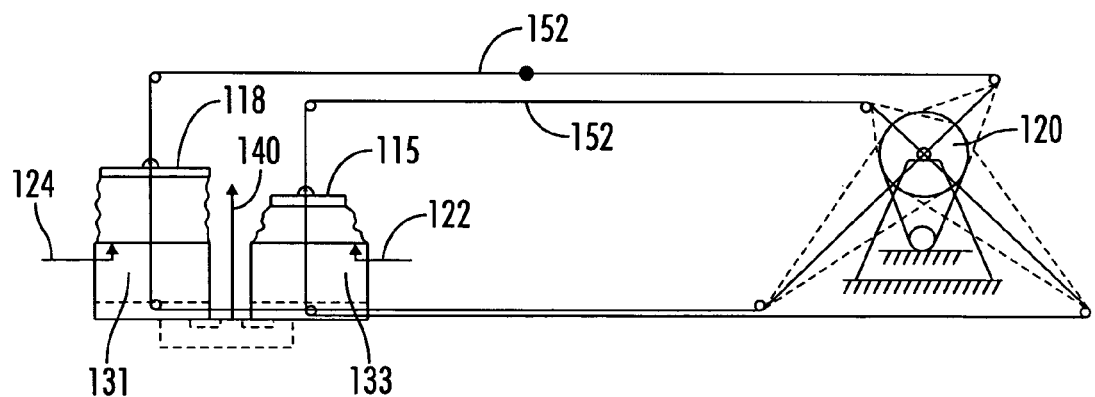
FIG. 12 depicts an embodiment of a heat engine with a synchronizer in accordance with the present invention.
Figure 13:
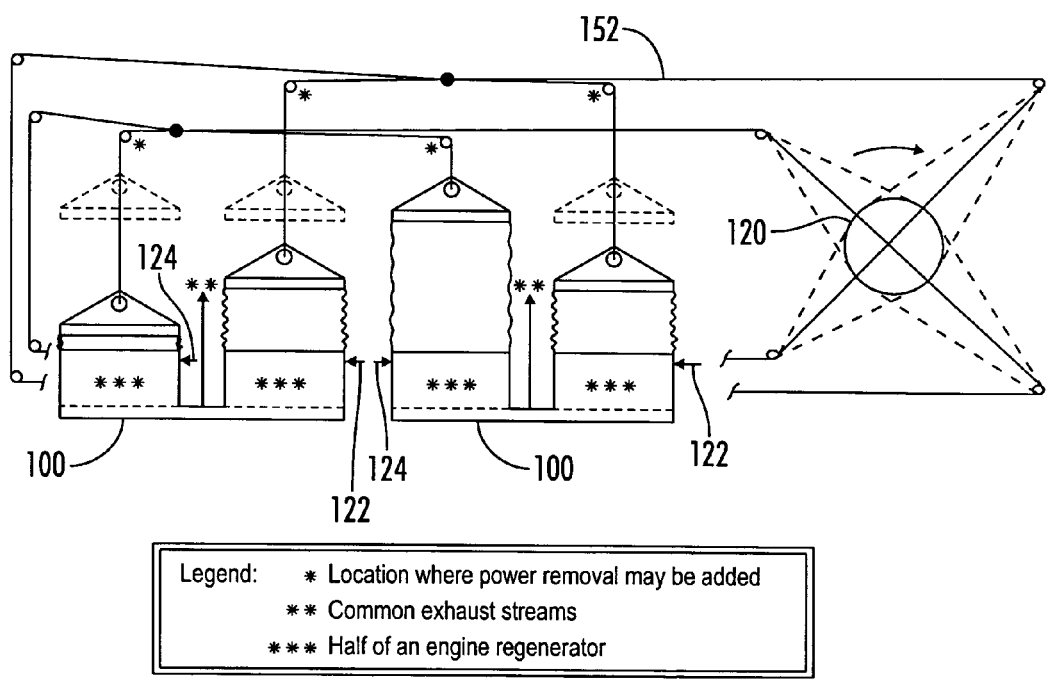
FIG. 13 depicts an embodiment of a system having two heat engines in accordance with the present disclosure.
Figure 14:
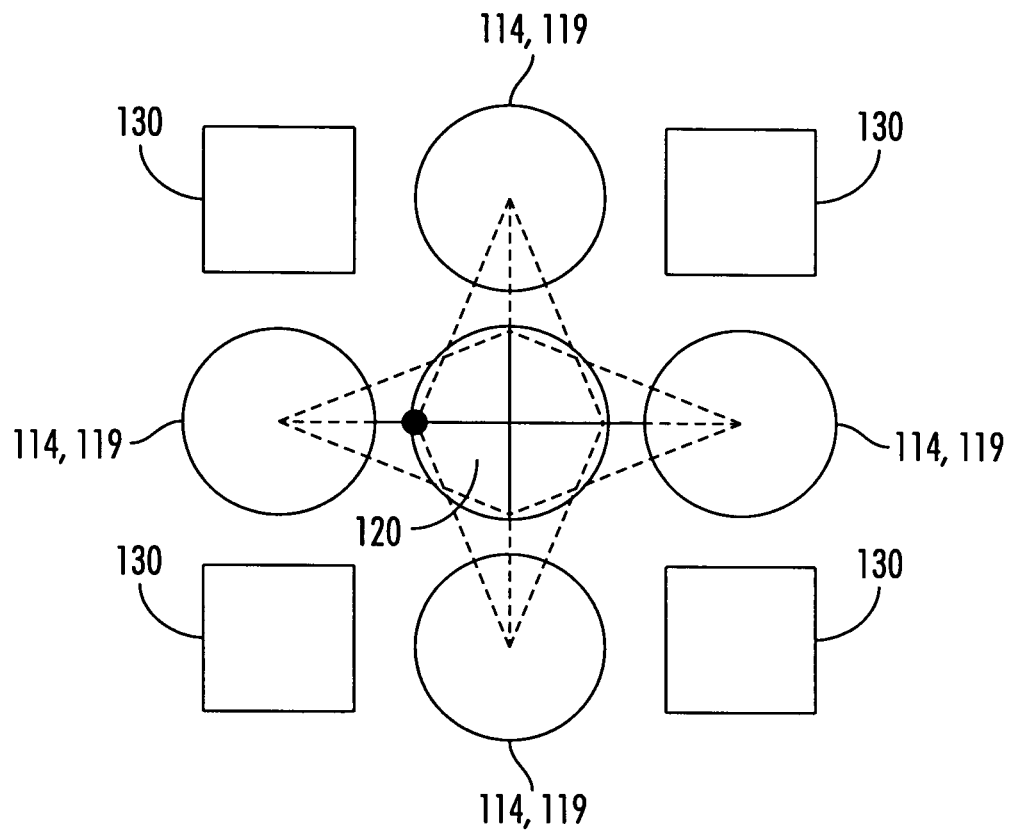
FIG. 14 depicts an embodiment of a system having multiple heat engines with regenerators and a single synchronizer.

FIG. 12 depicts an embodiment of a timing wheel, a synchronizer, for a crossover engine 100. As the timing wheel rotates a cable 152 moves the hot piston 118 between a power stroke and an exhaust stroke. The cold piston 115 moves through a compression stroke and an exhaust stroke. The hot piston 118 and the cold piston are 90 degrees out of phase as shown by the attachment points and pulleys of the timing wheel 120. Hot air from the hot side 131 of the HVR 130 provides heat energy for the power stroke of the hot piston. Cool air from the cold side 133 of the HVR 130 is compressed by the cold side piston 115. Exhaust air from the cylinders is combined in the HVR 130 and exits as a discharge stream 140. FIG. 13 depicts a timing wheel 120 that is connected to two heat engines. The timing wheel synchronizes the flow of streams to provide for conversion of heat to mechanical energy. Power removal is available at the pulleys by a direct coupling or a speed change coupling to an electrical generator (not shown). FIG. 14 depicts four crossover engines 100 formed by an arrangement of four HVRs 130, four hot cylinders 119, and four cold cylinders 114. In one embodiment an HVR 130 is dedicated to each crossover engine 100. In another embodiment HVRs 130 are shared by the crossover engines 100.

Figure 15A:
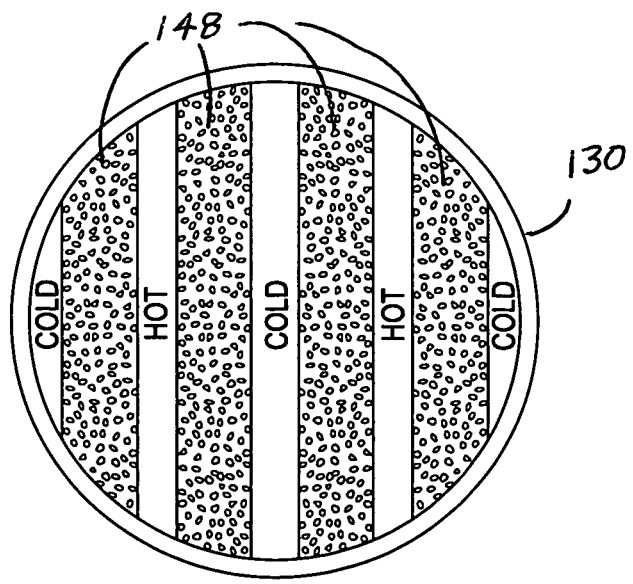
FIGS. 15A, 15B and 15C depict another embodiment of the heat engine in accordance with the present disclosure.
Figure 15B:
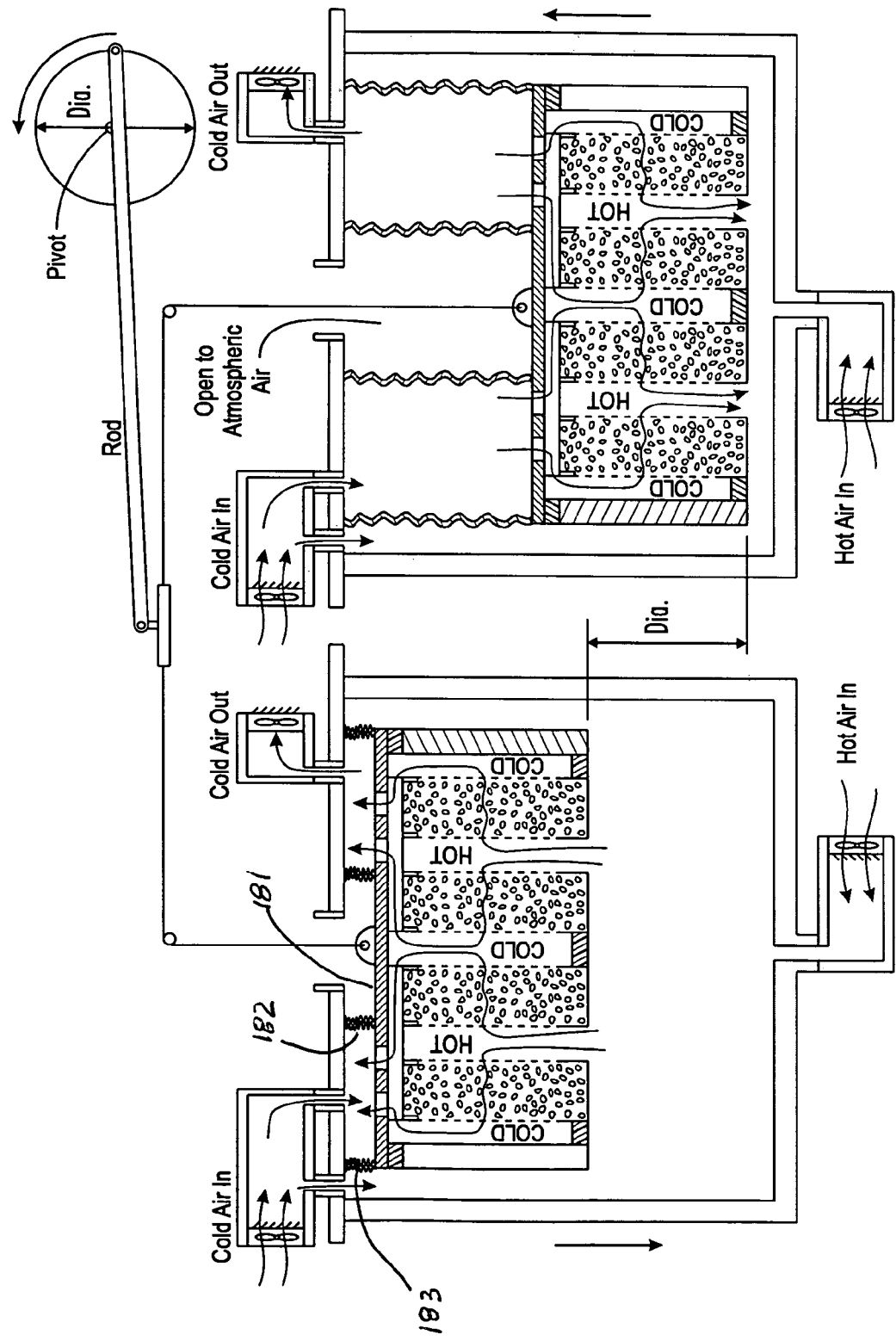

FIG. 15A depicts an HVR 130 having a cylindrical shape. Within the cylinder are separators that form cavities for thermal fill material 148 and channels for air flow. Hot air from the heating stream is shown in hot channels and cold air from the cooling stream is shown in cold channels. The thermal fill material 148 serves as the heat exchanger for the crossover engine 100. The thermal fill material 148 has good heat transfer characteristics and is a low cost material. FIG. 15B depicts the HVR 130 of FIG. 15A as a component of a crossover engine serving as a single piston that is both a hot piston and a cold piston.

The embodiment of the crossover engine 100 as seen in FIG. 15B depicts an engine with two pistons wherein each piston has a single cylinder. Each of the cylinders has a cylindrical shape that contains a piston. Each of the pistons is comprised of top plate 181 coupled to a reciprocating regenerator 130. The hot side of the cylinder receives hot air through a hot air input. The hot air input pushes air into the hot side of the cylinder using a fan 180 with louvers. The fan 180 with louvers prevents back flow of air.

Figure 15C:
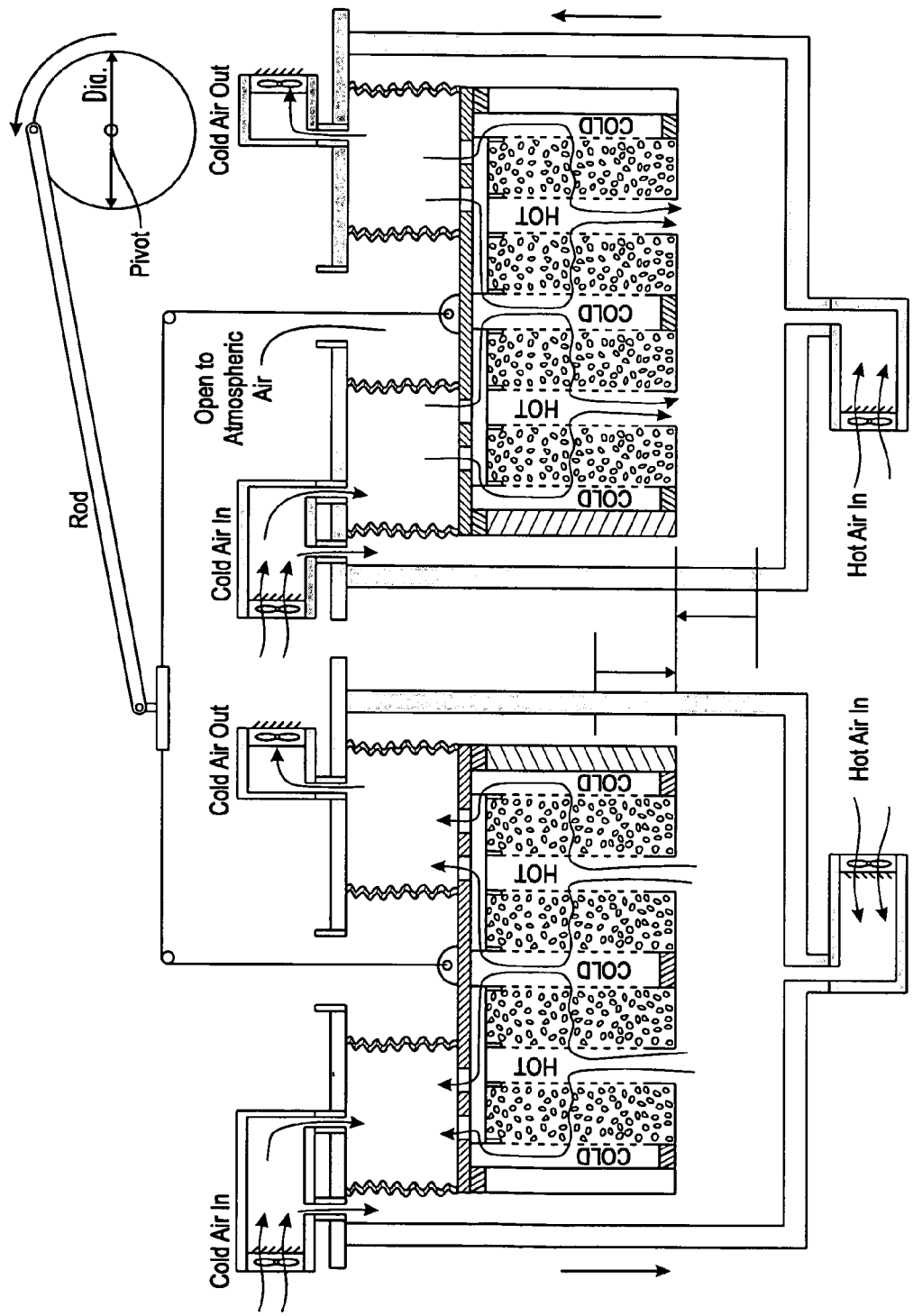

The cold side cylinder is formed in the annulus between inner wall fabric 182 and outer wall fabric 183. The wall fabrics of the cold cylinder are attached to the containment enclosure on the top end of the fabrics and the bottom end of the fabrics are attached to the cold end of the regenerator 130. Such an arrangement places all of the temperature limited fabric of the cold side cylinder near the cooling air in order to keep the fabric from overheating. In some embodiments of the cold cylinder horizontal ties or cross members are placed inside the cylinder fabric to reduce the chance of cylinder bulging. For the embodiment of FIGS. 15B and 15C the heating stream is the expensive stream and is a high temperature stream, greater than 300 degrees Centigrade or more. Because the heating stream is the expensive stream, the exhaust port for the discharge stream 140 is located placed on the top of the containment enclosure near to the entrance port of the cooling stream.

As the regenerator moves upward toward the top of the container the fabric collapses forcing the cold air though the regenerator from the cold side to the hot side. Such flow of air increases the pressure below the piston that is open to the atmosphere thereby creating an upward lift on the piston as it moves upward.

The hot end cylinder is formed by the bottom of the regenerator and walls and bottom of the containment enclosure. The hot end cylinder receives a high temperature heating stream 124 without the need for a Stirling engine heat exchanger, via an input port having a fan 180 with louvers. For a high quality input heating stream, such as a stream having temperatures greater than 300 degrees Centigrade, the fabric of the cold cylinder side may require some cooling or may have to be made of a fabric adapted to withstand high temperatures. In an embodiment of the regenerator 130 of FIG. 15B the regenerator may be comprised of multiple regenerator segments. The use of multiple regenerator segments is useful if there is a need to make larger crossover engines. The regenerator segment structure of a regenerator is particularly desirable for scale up of crossover engines.

Figure 16:
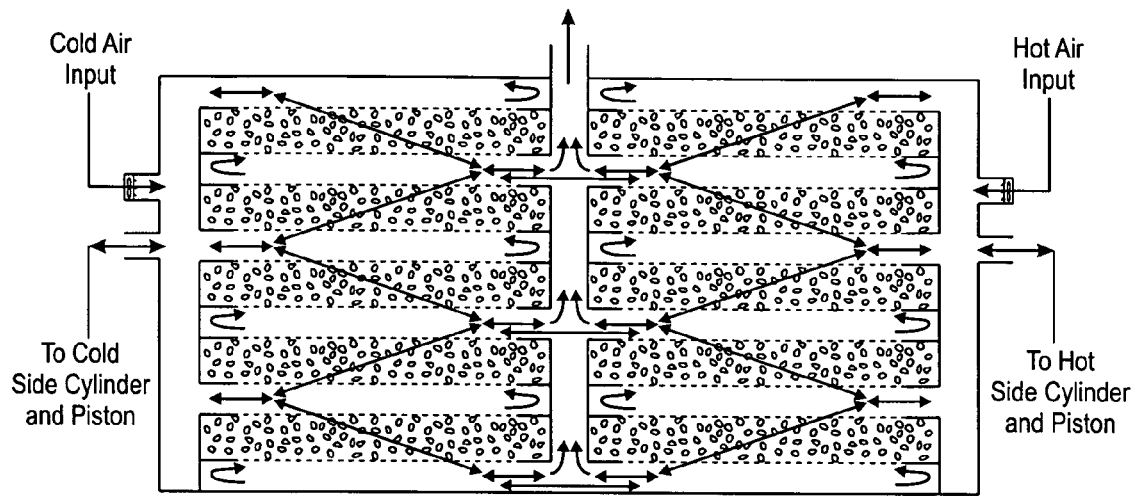
FIG. 16 depicts another embodiment of a regenerator for the heat engine of FIG. 2.

FIG. 16 depicts an embodiment of HVR 130 for the crossover engine 100. The cooling stream 122 is shown entering the left side of the HVR 130. A portion of the cooling stream 122 is directed to the cold side of the cylinder of the crossover engine via conduit 145. Another portion of the cooling stream is mixed with compression air from the cold cylinder and through parallel channels 149 of the HVR as depicted by openings on the left side of the HVR. Because the channels are blocked on their right end, the air is directed to flow through the thermal material 148. Some of the air going through thermal material 148 going through the thermal material becomes part of the discharge stream 140 and another portion exchanges heat with the heating stream. A portion of the heating stream 124 that enters the HVR is directed to the hot side cylinder via conduit 142. Another portion of the heating stream 124, during the exhaust stroke of the hot cylinder and is exchanges energy with air from the cold cylinder and through parallel channels 149 of the HVR. Because the channels adjacent to the heating stream entrance are blocked on their right end the air is directed through the thermal material 148. Some of the air going through the thermal material 148 becomes part of the discharge stream 140.

Figure 17:
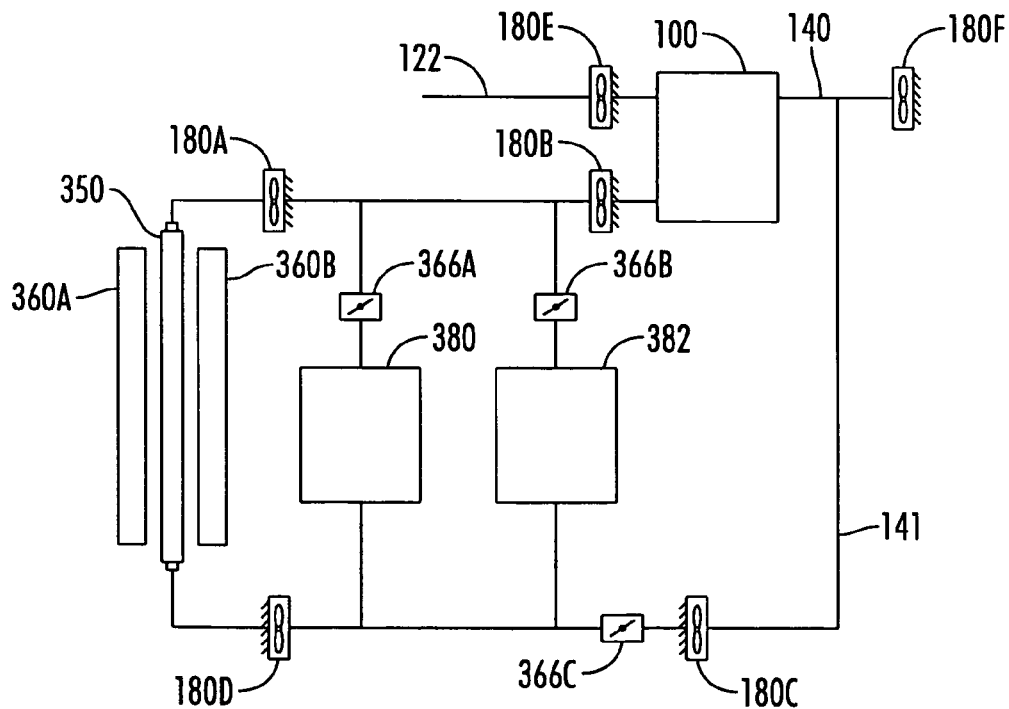
FIG. 17 depicts details for an embodiment of regenerator for the heat engine of FIG. 2.

FIG. 17 depicts a crossover engine 100 having a cooling stream 122 and a heating stream 124. The cooling stream 122 as shown in FIG. 17 is ambient air. The heating stream 124 receives air from a solar collector 350 where solar radiation is the energy source. In order to concentrate solar radiation, the solar collector has solar reflectors 360 for focusing radiation from the sun. Fans 180 with louvers act as directional flow valves to ensure a desired direction of air flow. In order to provide for night time operation, when no solar energy is immediately available, a primary heat storage element 380 is provided so that a heating stream 124 is available when the solar heat collector is not receiving solar energy. In another embodiment an overflow heat storage element 382 is provided to store solar energy from the solar heat collector 350 and heat from In order for the crossover engine to compete with other renewable energy sources it is necessary to provide a low cost heating stream 124. One technique to provide a low cost heating stream is to collect large amounts of solar energy. It has been observed that soil solarization techniques, as reported in agriculture technology reports, experience soil temperatures in the range of 40 to 70 degrees Centigrade at a depth of 3 to 4 inches using a single layer of plastic. Such an approach to collecting solar energy using a single layer of plastic provides stream temperature differentials of 40 to 60 degrees Centigrade on a sunny day if ambient air is the cooling stream 122. A 60 degree differential is available during the best collection part of the day and the 20 degree Centigrade differential at other parts of the day. Some amount of extended operating time can be obtained by using thermal energy storage, as described above, to operate beyond the sun collection time. During times of normal humidity, evaporative cooling of the ambient air provides a cooling stream with temperatures below ambient air thereby further increasing crossover engine temperature differentials.

The single layer plastic solar collector is further improved by focusing solar energy on the plastic sheet with reflectors, such as mirrors. The focusing technique increases the heating stream temperature an additional 15 to 20 degrees Centigrade. In other embodiments for providing the heating stream more reflectors may be added. The result is that 90 degree centigrade temperature heat can be reasonably obtained on sunny days in the southern part or the United States and most other parts of the country using a single layer of plastic and two levels of reflection to configure a low cost collector for providing a heating stream. To configure such a collector for continuous flow delivery of hot air, the collector needs to be very long. For a one acre plot a length of 1000 feet a width of 43.6 feet is required for a solar collector. In another embodiment, perhaps more manageable two 1000 foot strands would reduce the width to 21.8 foot. Different combinations of widths and lengths can be used to match the size plot desired. Rapid heat gain with high efficiency is obtained on the ambient temperature inlet end of the solar collector where there is low energy loss and high collector efficiency resulting in a high rate of temperature gain. Near the hot end of the collector where there is more heat loss and the stagnation temperature is slowly approached, the collector efficiency and rate of temperature gain is much lower. The agriculture greenhouse industry has supplemental supporting information for solar heating of air.

An alternative for solar collection is the use of standard commercial parabolic collectors equipped for handling air. Normally sun-tracking parabolic collectors are very long and oriented from north to south and obtain a temperature rise of over 400 degrees C. using a liquid working fluid. Much shorter standard parabolic collectors equipped for handling air are used in an embodiment of the solar collector for the crossover engine in order to obtain temperature differentials of 20 to 60 degree Centigrade. A heating stream with such temperature differentials is desirable for efficient crossover engine operation.

The single layer plastic collector with reflectors as described above can be configured in an east-west oriented fixed position collector without automatic sun tracking. This arrangement could be configured with a long plastic tube with a mirror mounted on each side. The north side mirror is placed above and behind the collector and reflects solar radiation downward to the collector. The south side mirror can rest on the ground and reflect upwards on the collector. The horizontal reflector area covered on the south side of the collector and the horizontal shaded area on the north side of the collector reduces the size of the collector. In this method of collection, automatic sun tracking is not required. Design of the crossover engine becomes a tradeoff or balancing act in specifying component unit cost, unit size, features, and parameters. The regenerator needs to be thin to get the most power per unit of regenerator volume. In contrast the HVR needs to be thick enough to have a desired effectiveness. As the HVR cross-section for a given volume increases and the HVR thickness decreases, and the optimum crossover engine speed increases. The HVR dimensions also impacts the ruggedness of the mechanical drive system. A higher speed favors use of a lower torque rated speed increaser for the timing wheel. A higher speed puts more wear and tear on the folding piston walls. A smaller HRV could justify use of a more expensive regenerator material.

To better understand the various interactions and tradeoffs for a crossover engine system, examples for three levels of temperature differences will be compared. The lowest temperature differential is for the lowest temperature case and is the least expensive or may be experienced on a less sunny day. The highest level temperature differential will be the most expensive or experienced on a highly sunny day. The mid case temperature difference is between these extremes. One use for the crossover engine is projected to be for farmers. Thus consider the amount of solar energy that can be obtained from one acre of a farmers land. The use of solar energy maps, such as those published by branches of the U.S. Government are used in the calculations.

The amount of energy obtained from the sun on a fixed collector varies through out the day. Therefore, to simplify calculations to a manageable level it is desirable to consider all of the collected energy to be stored and withdrawn store on some consistent basis such as at three levels of temperature. The engine configuration and capacity to accommodate the stream size for each of these temperatures is calculated. Then the engine efficiency for each level of regenerator effectiveness is calculated. The regenerative thermal oxidizer industry provides important information on regenerator materials for regenerative machines of the size used in low-temperature regenerative engines, such as the crossover engine. Regenerators in early regenerative thermal oxidizers had effectiveness levels as low as 75%. Improvements have been made in regenerator materials, and today most regenerative thermal oxidizers advertise thermal energy recovery at 95%.

To make the engine analysis and calculation simpler and more understandable, assume that all of the energy from a solar collector on an acre of land is stored and withdrawn uniformly over a 24 hour period. The 8092 kWh per day collected divided by 24 hours gives 337.17 kWh per hour of thermal energy input for the crossover engine. In the following analysis the thermal energy available per hour is used.

Consider the air leaving storage and arriving as input to the engine being broken down into temperature brackets. Fully charged storage can deliver air at a higher temperature. For sizing engines consider that three temperature profiles. Temperature of air coming from storage is 40 degrees, 60 degrees, and 80 degrees for temperature differentials of 20, 40, and 60, degrees Centigrade respectively. Engine efficiency using typical heat engines might be estimated by using the Carnot efficiency, one half of the Carnot efficiency, or the endoreversible method. For sizing an embodiment of a crossover engine the endoreversible method is used since, in recent years, it has been promoted as a more practical and closer to reality approach.

To make the engine analysis and calculation simpler and more understandable, assume that all of the energy from a solar collector on an acre of land is stored and withdrawn uniformly over a 24 hour period. The 8092 kWh per day collected divided by 24 hours gives 337.17 kWh per hour of thermal energy input for the crossover engine. In the following analysis the thermal energy available per hour is used.

Consider the air leaving storage and arriving as input to the engine being broken down into temperature brackets. Fully charged storage can deliver air at a higher temperature. For sizing engines consider that three temperature profiles. Temperature of air coming from storage is 40 degrees, 60 degrees, and 80 degrees for temperature differentials of 20, 40, and 60, degrees Centigrade respectively. Engine efficiency using typical heat engines might be estimated by using the Carnot efficiency, one half of the Carnot efficiency, or the endoreversible method. For sizing an embodiment of a crossover engine the endoreversible method is used since, in recent years, it has been promoted as a more practical and closer to reality approach.

In order to understand the sizes of engines and regenerators evaluations have been made for regenerator sizes and engine sizes. For the three temperature differentials as stated above a regenerator with a thickness of 3.44 feet would have an engine with respective speeds of 29.3 rpm, 30.0 rpm, and 30.6 rpm. The engine would have respective volumes of 1073 cubic feet, 557 cubic feet, 386 cubic feet. With the scale up feature of the crossover engine other sizes of HVRs (the regenerator), rotations speeds, and engine sizes are possible. In fact the crossover engine, in general, is considerably larger than any know heat engine.

The above engine volume numbers are for an unspecified generic theoretical basic heat engine using all of the energy input on a once through basis without any recycle of energy as occurs when a regenerator is used. This is the starting point for specifying a regenerative engine relative to regenerator effectiveness. A regenerative engine of the new novel type with less than perfect regenerator has air recycled back to where the cycle started that has a lower temperature than when the cycle started. Injection of higher temperature hot air from storage restores the temperature to where it was at the beginning of the previous cycle. The combined volume of new air from storage and air returned from the regenerator requires a larger volume engine. The larger the engine, the greater is the amount of energy transferred per cycle that is subject to the heat engine efficiency laws and thus a higher the engine capacity and overall efficiency. The higher the regenerator effectiveness becomes, the larger the engine volume needed. As engine size increases with increase in regenerator effectiveness the greater the capacity and overall efficiency for the same energy input.

Figure 18:
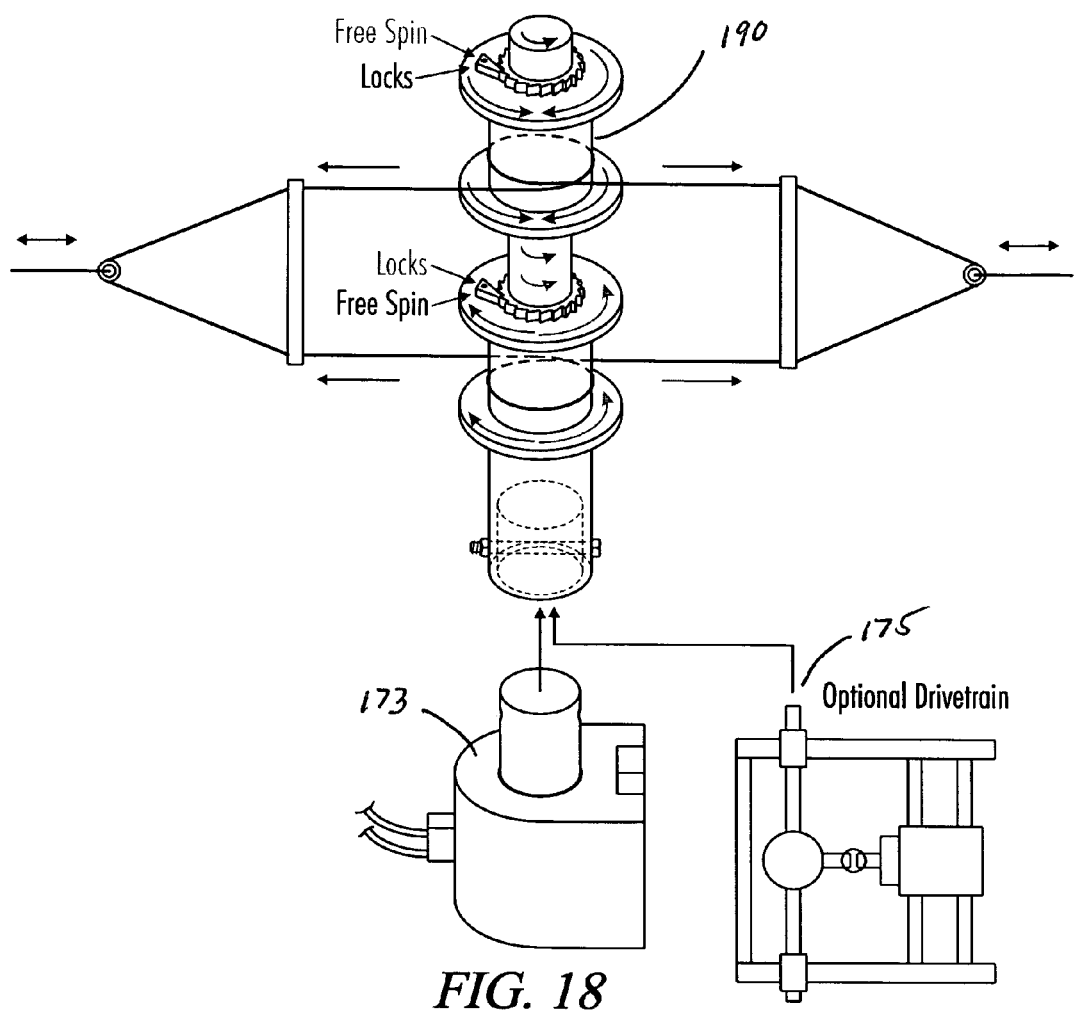
FIG. 18 depicts an embodiment of a speed increaser for matching the rotary speed of the heat engine of FIG. 2 to a high-speed generator.

FIG. 18 depicts an embodiment of a speed increaser for matching the rotary speed of a crossover engine to a high-speed generator. The tension media 152 of the crossover engine is wrapped about a spindle 190 that rotates in a single direction. Then a generator 173 with a speed increase is coupled to the spindle to ensure that both the crossover engine 100 that the generator 173 operate at a desired efficiency level. As alternate, another embodiment, the spindle 190 is coupled to an off the shelf or readily available speed increaser. The off the shelf speed increaser may be the differential of a automotive vehicle and therefore not meet the requirements of an inexpensive component.

Figure 19:
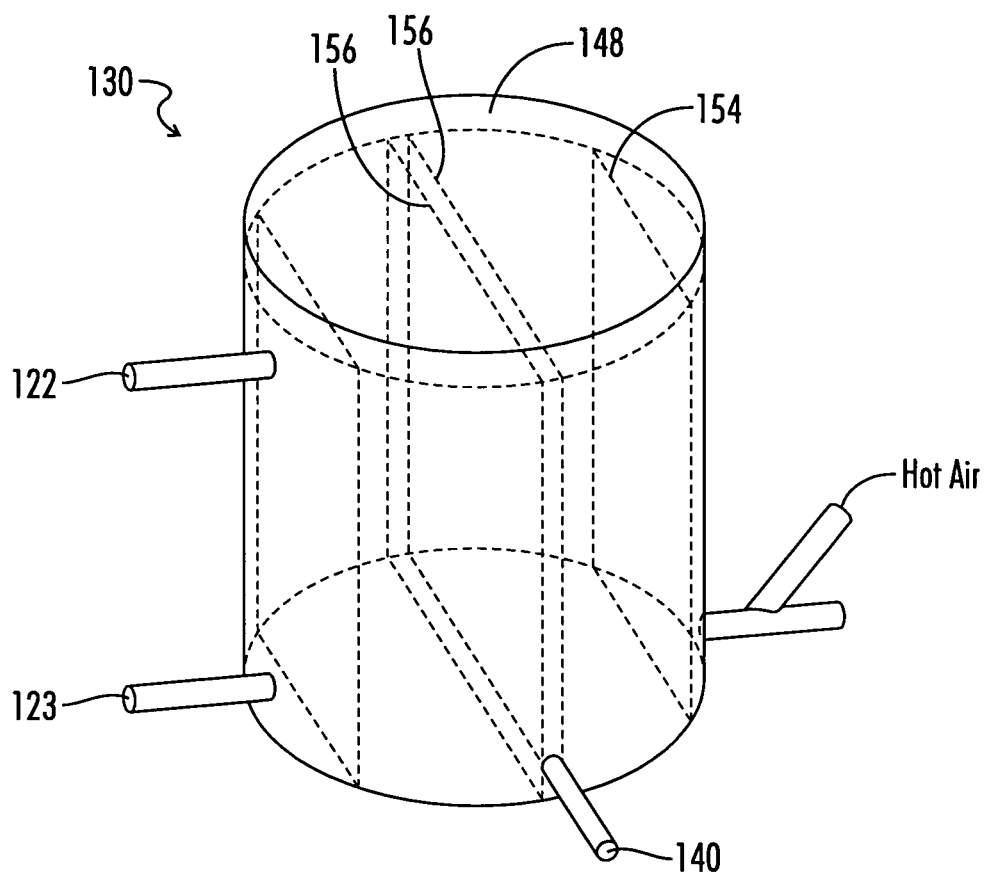
FIG. 19 depicts structural details of a regenerator for the heat engine of FIG. 2.
Figure 20:
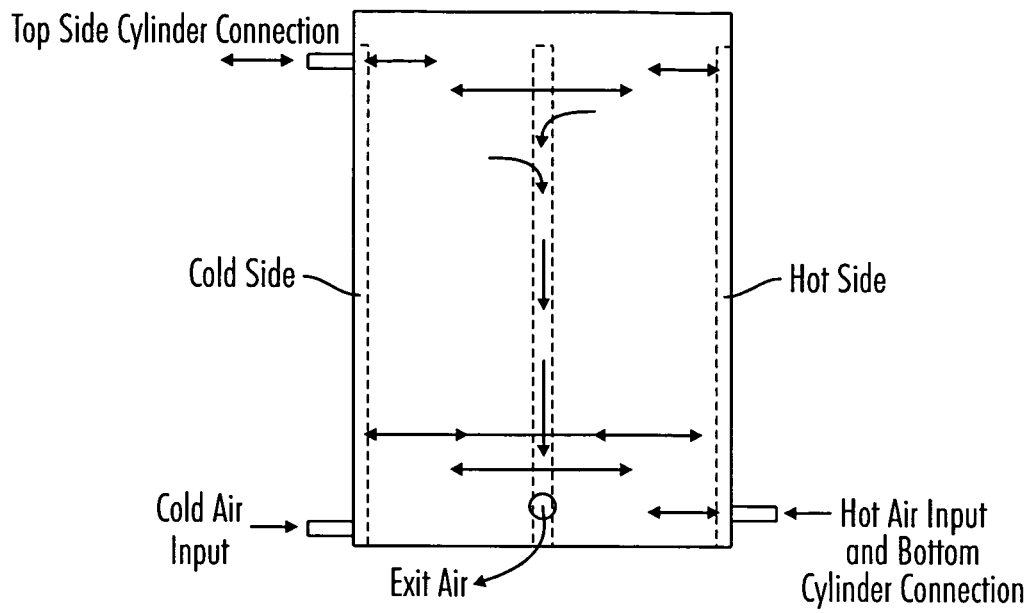
FIG. 20 depicts an embodiment of a regenerator having a thick structure.
Figure 21:
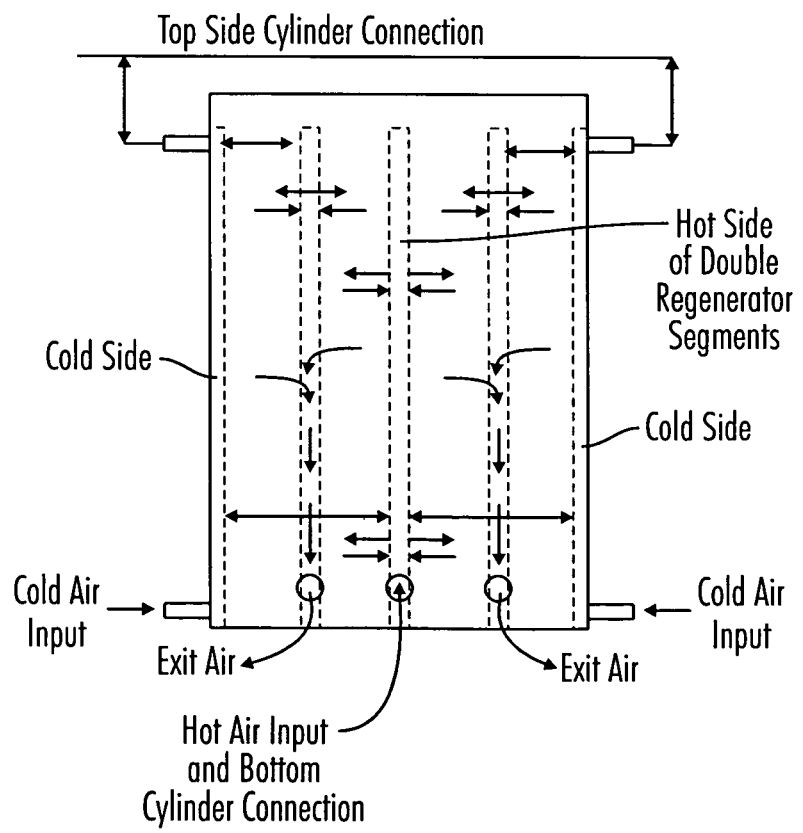
FIG. 21 depicts an embodiment of a regenerator having a thin structure.
Figure 22:
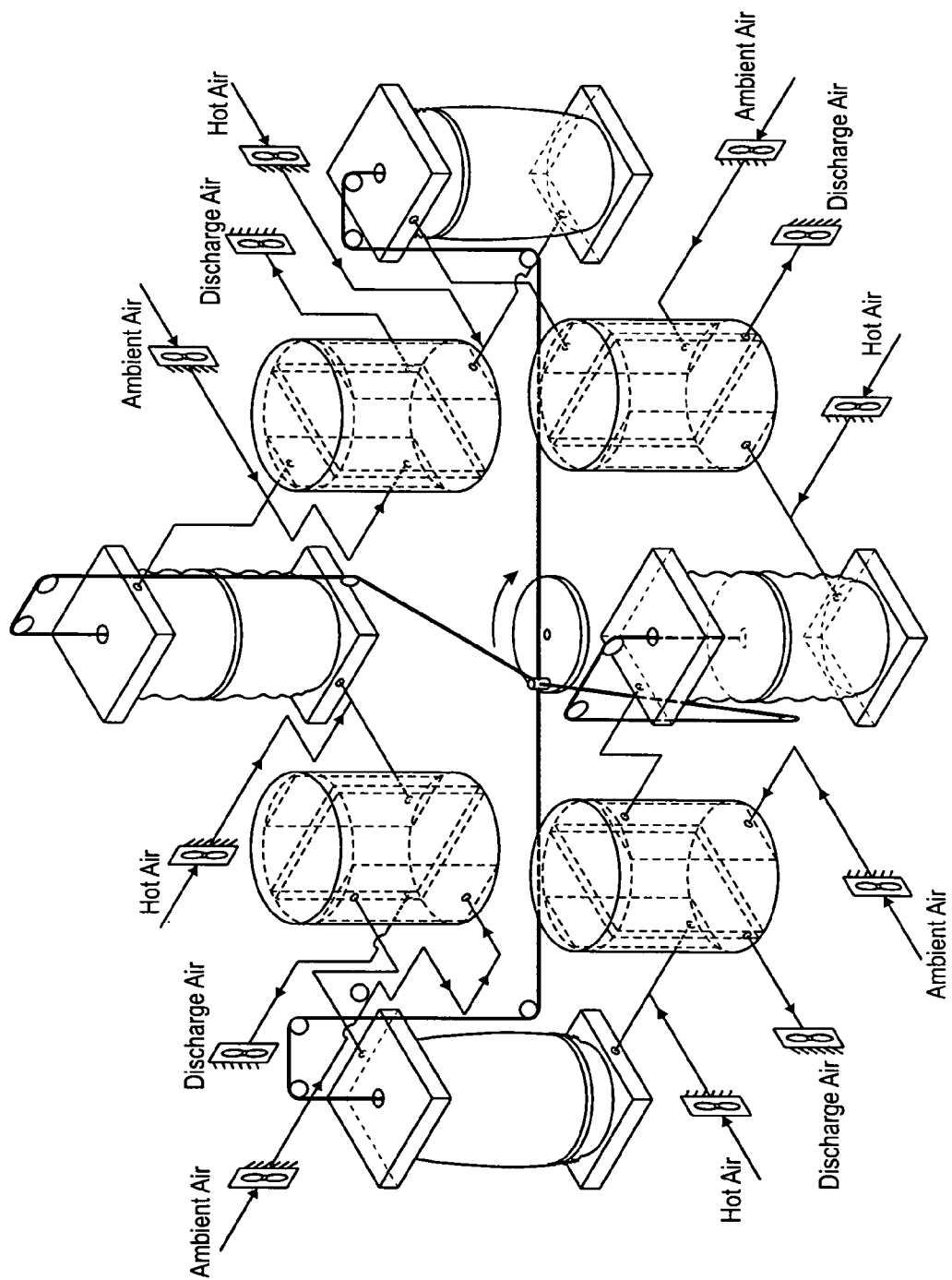
FIG. 22 depicts an embodiment of an array of crossover engines for the present disclosure.

FIG. 19 depicts structural details of a HVR 130 in accordance with the present disclosure. The HVR has a containment structure with a cylindrical shape. On one side of the containment structure has a cooling stream input port 122 and a cool stream conduit port for coupling the HVR to the cool side cylinder. On the opposite side of the containment structure is a heating stream port making a direct coupling with a heating steam conduit that is coupled to the hot cylinder (not shown). The walls of the containment structure have a vertical orientation as shown in FIG. 19. Within the cavity of the containment structure are grates that make contact with the inside surfaces of the containment structure. The grates, four in the FIG. 19, are mutually parallel. Between one of the edge grates 154, the one adjacent to the cooling stream ports, a central grate 156 is a cavity for receiving and containing thermal material regenerator for the heat engine of FIG. 2. A similar cavity is formed by the second edge grate 154 and the other central grate. The similar cavity also contains thermal material. Between the two central grates is a opening for receiving discharge stream air that flows downward and exits out a port that releases the discharge stream 140. The HVR of FIG. 19 has a top covering and a bottom covering. In one embodiment the ground, a gravel pad, or a concrete pad form the bottom covering. The top covering may be a cap that fits down over and forms a seal with the top of the containment structure. FIG. 20 is a side view of the HVR of FIG. 19. Another embodiment is depicted in a side view as FIG. 21. In the other embodiment additional grates are used to allow for a different level of heat transfer. Because there are more channels between the grates and the heat transfer efficiency of the HVR is more greater than for the HVR of FIG. 20.

Figure 23:
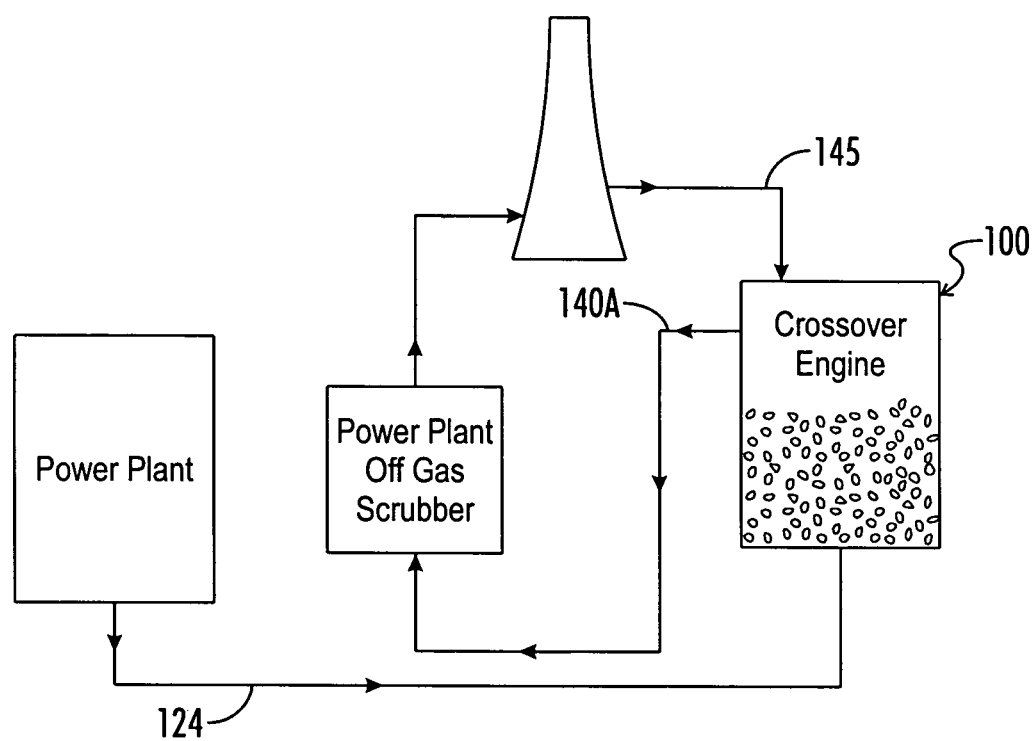
FIG. 23 depicts another embodiment of a crossover engine in accordance with the present disclosure.

FIG. 23 depicts an embodiment of an energy system comprised of a crossover engine coupled to a cooling tower 182 and a power plant 184. The cooling stream 122 enters the crossover engine via a conduit from the cooling tower. The heating stream is waste heat from the power plant and is coupled to the crossover engine via another conduit. The discharge stream exiting the crossover engine 100 is coupled to a scrubber, at a reduced temperature. The air leaving the scrubber serves as an input to the cooling tower 182.

Figure 24:
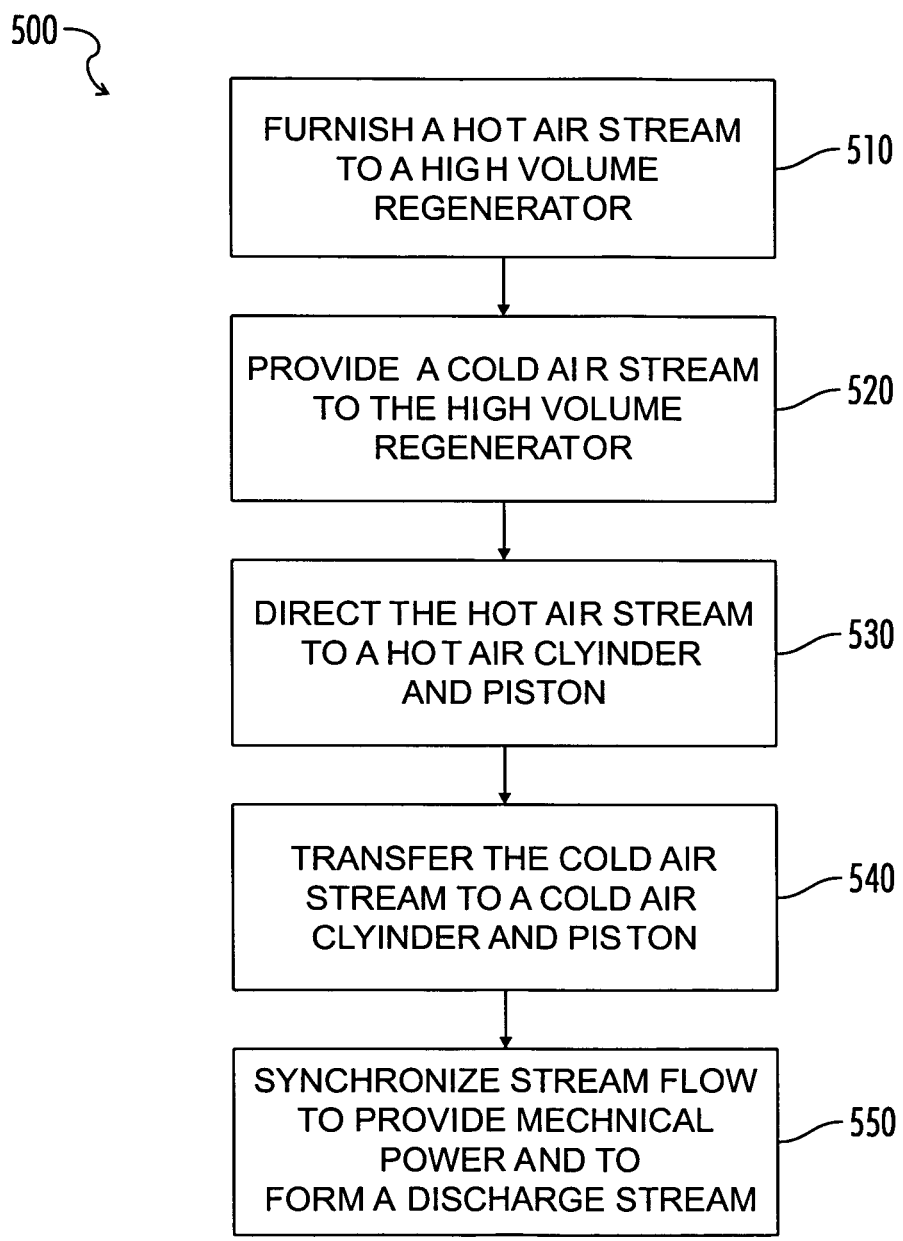
FIG. 24 depicts a method embodiment for the engine of FIG. 2.

An embodiment method for the crossover engine is depicted in FIG. 24. A heating stream is provided for a HVR, step 510, and a cooling stream is provided for the HVR. Hot air within the HVR is directed to a hot air cylinder and piston, step 530. Next, at later phase of operation, cold air is transferred to a cold air cylinder and piston. Air discharged from the pistons then forms a discharge stream, step 550, that exits the HVR.

Figure 25:
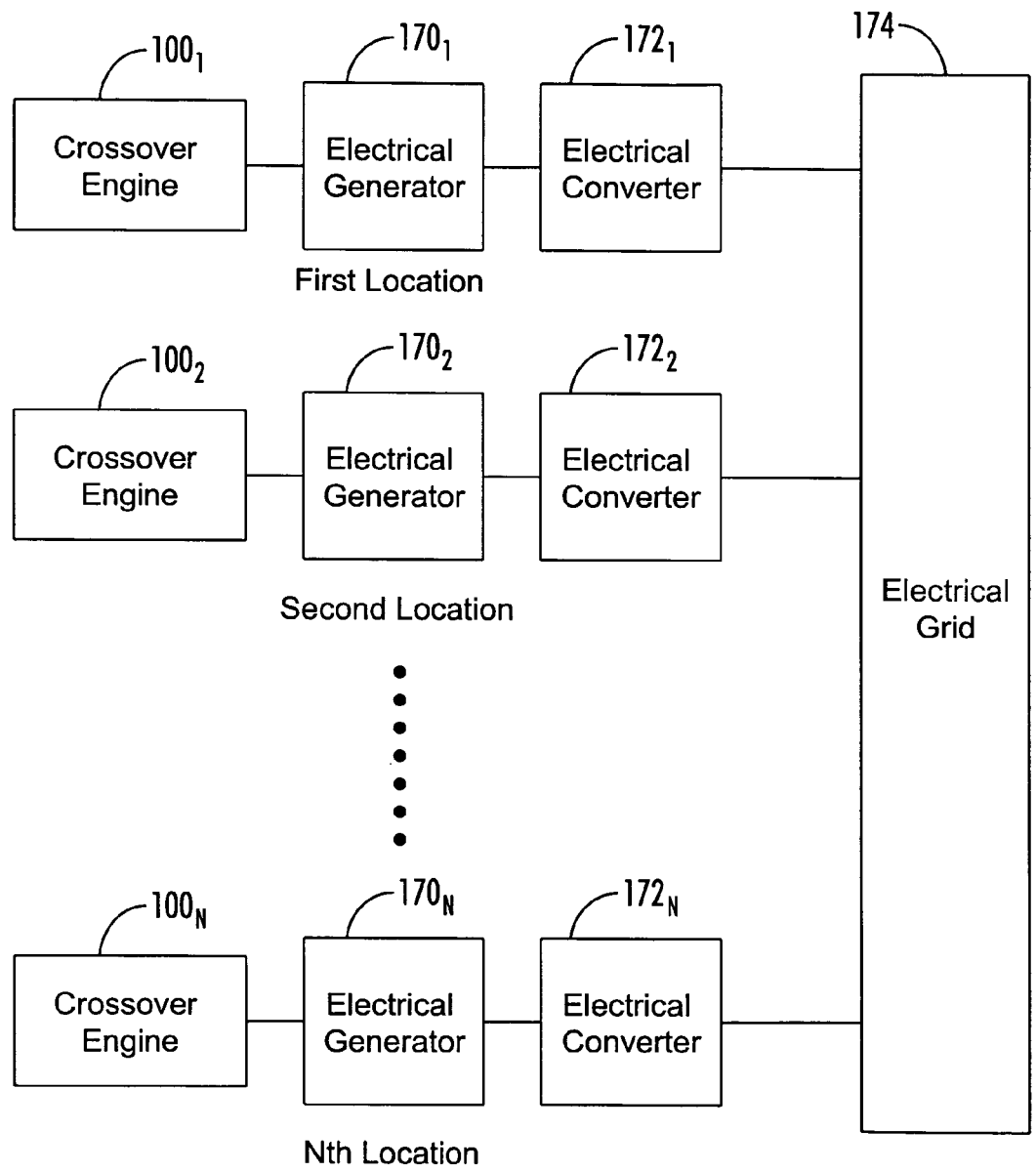
FIG. 25 depicts an embodiment of an array of crossover engines connected to a power grid in accordance with the present disclosure.

An embodiment of an electrical generating system is depicted in FIG. 25. Multiple crossover engines 100 are coupled with electrical generators 170. An electrical converter couples the output of the generator to an electrical grid 174. In one embodiment the converter changes a DC voltage to an AC voltage suitable for coupling to an AC grid. In other embodiments the generator converter may provide a DC voltage for a local grid. The energy driving the crossover engines may come from a variety of sources based on the cost of heat from the variety of sources.

The embodiments described above are provided to illustrate the operation of a new type of heat engine, the crossover engine. Other embodiments using the principles of the crossover engine as describe are possible.

Now, therefore, the following is claimed:

1. A heat engine, comprising:
   a hot cylinder with a hot air piston and a cold cylinder with a cold air piston;
   a timing crank coupled to the hot air piston and the cold air piston, the timing crank configured to synchronize air flow; and
   a regenerator having a first port for receiving a heating stream of air, a second port for receiving a cooling stream of air, a third port for exhausting a combined mixture of air streams, wherein the combined mixture includes a hot cylinder air mixture and a cold cylinder air mixture, a fourth port configured for reversibly exchanging the hot cylinder air mixture between the hot cylinder and the regenerator, a fifth port for reversibly exchanging the cold cylinder air mixture between the cold air cylinder and the regenerator, wherein the timing crank, pistons, the heating stream of air, and the cooling stream of air create cyclic flow, compression, and temperature gradients within in the regenerator in response to the heating stream of air and the cooling stream of air.

2. The heat engine of claim 1, wherein the heating stream of air has temperatures between 5 and 30 degrees Celsius.

3. The heat engine of claim 1, wherein the position of the third port is closest to the second port if the cost of the cooling stream of air is less than the cost of the heating stream of air.

4. The heat engine of claim 1, wherein the hot cylinder and the cold cylinder have cylinder walls of flexible fabric.

5. The heat engine of claim 1, wherein the cooling stream of air is a stream of ambient air.

6. The heat engine of claim 1, wherein the cooling stream of air and the heating stream of air are directed by louvers and fans.

7. A heat engine comprising:
   a regenerator with five ports, wherein a first port serves as an input for a cooling stream of air, a second port serves as an input for a heating stream of air, a third port serves as an exhaust port for a mixture of air streams, a fourth port configured to reversibly exchange a hot air mixture, and a fifth port configured to reversibly exchange a cold air mixture;
   a hot cylinder with a hot air piston, the hot air cylinder coupled to the fourth port of the regenerator;
   a cold cylinder with a cold air piston, the cold cylinder coupled to the fifth port of the regenerator; and
   a timing crank coupled to the hot air piston and the cold air piston, the timing crank configured to synchronize air flow.

8. The heat engine of claim 7, wherein the heating stream of air has temperatures between 5 and 30 degrees Celsius.

9. The heat engine of claim 7, wherein the position of the third port is closest to the second port if the cost of the cooling stream of air is less than the cost of the heating stream of air.

10. The heat engine of claim 7, wherein the hot cylinder and the cold cylinder has cylinder walls of flexible fabric.

11. The heat engine of claim 7, wherein the cooling stream of air is a stream of ambient air.

12. The heat engine of claim 7, wherein the cooling stream of air and the heating stream of air are directed by louvers and fans.

* * * * *